United States Patent
Uchino et al.

(10) Patent No.: US 9,848,401 B2
(45) Date of Patent: Dec. 19, 2017

(54) MOBILE DEVICE, LOCATION ESTIMATION METHOD, AND COMPUTER-READABLE RECORDING MEDIUM

(71) Applicant: FUJITSU LIMITED, Kawasaki-shi, Kanagawa (JP)

(72) Inventors: Makoto Uchino, Hamura (JP); Satoshi Sakita, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 70 days.

(21) Appl. No.: 14/978,823

(22) Filed: Dec. 22, 2015

(65) Prior Publication Data

US 2016/0227507 A1 Aug. 4, 2016

(30) Foreign Application Priority Data

Feb. 2, 2015 (JP) ................................. 2015-018837

(51) Int. Cl.
*H04W 64/00* (2009.01)
*G01S 5/14* (2006.01)
(Continued)

(52) U.S. Cl.
CPC .......... *H04W 64/00* (2013.01); *G01S 5/0268* (2013.01); *G01S 5/14* (2013.01); *H04W 88/02* (2013.01); *H04W 88/08* (2013.01)

(58) Field of Classification Search
CPC ..... H04W 64/00; H04W 88/02; H04W 88/08; G01S 5/14; G01S 5/0268
See application file for complete search history.

(56) References Cited

U.S. PATENT DOCUMENTS

2002/0193942 A1* 12/2002 Odakura ............... G01S 5/10
455/456.6
2004/0248589 A1* 12/2004 Gwon ............... G01S 5/0252
455/456.1
(Continued)

FOREIGN PATENT DOCUMENTS

JP 02-044929 2/1990
JP 2004-361412 12/2004
(Continued)

OTHER PUBLICATIONS

EESR—The Extended European Search Report of European Patent Application No. 15201343.9 dated Jun. 28, 2016. US2004/248589A1 cited in the EESR was previously submitted in the IDS dated Dec. 22, 2015.

*Primary Examiner* — Brandon Miller
(74) *Attorney, Agent, or Firm* — Fujitsu Patent Center

(57) ABSTRACT

A mobile device estimates includes a processor configured to execute a process. The process includes first estimating a location of each of a plurality of base station devices present at a location communicable with the mobile device. The process includes generating a circle a radius of which is a distance between the mobile device and the base station device estimated by using radio wave intensity from the base station device, around the location of the base station device estimated at the first estimating, for each of the base station devices. The process includes second estimating a location of the mobile device by using algorithm selected based on the number of the circles of the base station devices generated at the generating and a location relation between the circles.

9 Claims, 10 Drawing Sheets

(51) Int. Cl.
*G01S 5/02* (2010.01)
*H04W 88/02* (2009.01)
*H04W 88/08* (2009.01)

(56) References Cited

U.S. PATENT DOCUMENTS

2012/0320873 A1* 12/2012 Zhou .................... H04W 16/02
 370/331
2014/0087763 A1 3/2014 Gao et al.

FOREIGN PATENT DOCUMENTS

| WO | 2014022069 A1 | 2/2014 |
| WO | 2014092945 A1 | 6/2014 |

* cited by examiner

| SERIAL NO. | BASE STATION ID | LATI-TUDE | LONGI-TUDE | RADIO WAVE INTENSITY | FRE-QUENCY | RELIA-BILITY | PSC |
|---|---|---|---|---|---|---|---|
| 1 | 10 | 36.2 | 139.1 | -80 | 800 MHz | A | P00 |
| 2 | 10 | 36.1 | 139.1 | -85 | 800 MHz | B | P01 |
| 3 | 10 | 36.2 | 139.2 | -90 | 800 MHz | A | P02 |
| 4 | 10 | 36.2 | 139.2 | -100 | 800 MHz | A | P03 |
| 5 | 100 | 36.3 | 139.3 | -97 | 2 GHz | A | P04 |
| 6 | 200 | 36.1 | 139.2 | -85 | 2 GHz | C | P05 |
| ⋮ | ⋮ | ⋮ | ⋮ | ⋮ | ⋮ | | |

MOBILE DEVICE, LOCATION ESTIMATION METHOD, AND COMPUTER-READABLE RECORDING MEDIUM

CROSS-REFERENCE TO RELATED APPLICATION

This application is based upon and claims the benefit of priority of the prior Japanese Patent Application No. 2015-018837, filed on Feb. 2, 2015, the entire contents of which are incorporated herein by reference.

FIELD

The embodiments discussed herein are related to a mobile device, a location estimation method, and a location estimation program.

BACKGROUND

In recent years, with the spread of mobile devices such as smartphones, applications that use location information have become popular. In general, a global positioning system (GPS) positioning method and a positioning method using a wireless local area network (LAN) connection service are known as a method for determining location information. However, a base station positioning method that consumes less power is used for the mobile devices and the like.

The base station positioning method is a method that estimates the location of a mobile device, based on the location of a serving base station captured by the mobile device and the location of a neighboring base station. For example, a mobile device acquires ID information from a base station captured by the mobile device. The mobile device also acquires ID information from a base station in the vicinity of the captured base station. The mobile device then transmits the acquired ID information to a server and acquires location information, which is estimated by the server from the ID information. Examples are disclosed in Japanese Laid-open Patent Publication No. 2004-361412 and Japanese Laid-open Patent Publication No. 02-044929.

However, the base station positioning method estimates the location information of a mobile device by only using the location information of the base station. Hence, the accuracy of the location information is not sufficient. Also, because the positioning method using GPS or wireless LAN consumes large power, it is not suitable for the mobile device the size of which has been reduced and the performance of which has been improved.

SUMMARY

According to an aspect of the embodiment, a mobile device includes a processor configured to execute a process. The process includes first estimating a location of each of a plurality of base station devices present at a location communicable with the mobile device; generating a circle a radius of which is a distance between the mobile device and the base station device estimated by using radio wave intensity from the base station device, around the location of the base station device estimated at the first estimating, for each of the base station devices; and second estimating a location of the mobile device by using algorithm selected based on the number of the circles of the base station devices generated at the generating and a location relation between the circles.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Preferred embodiments will be explained with reference to accompanying drawings. However, the present invention is not limited by the embodiments.

[a] First Embodiment

Overall Configuration

Figure 1:
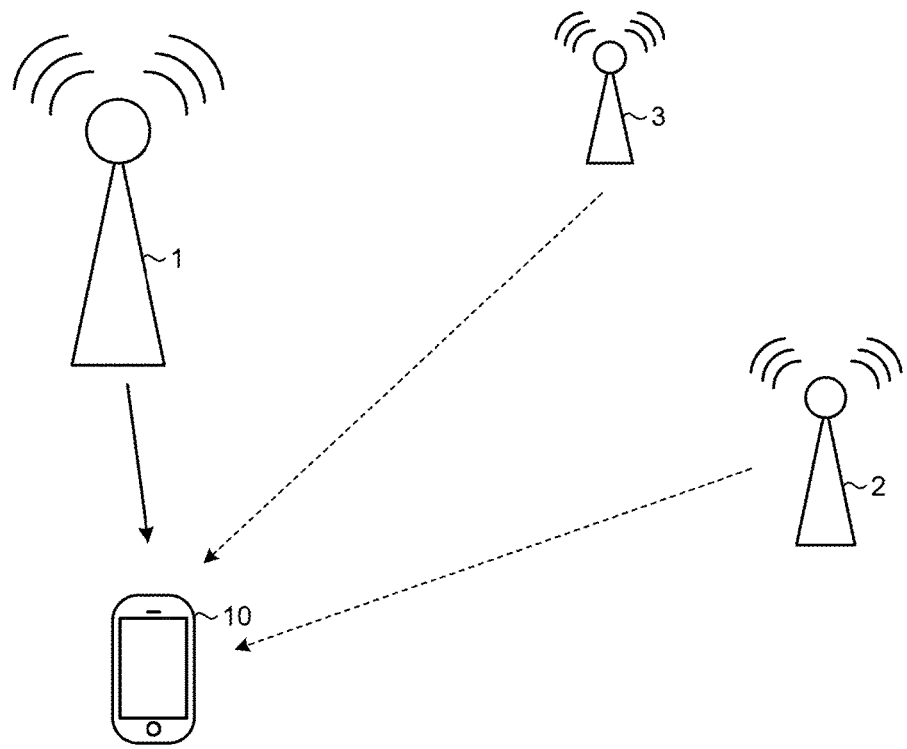
FIG. 1 is a diagram illustrating an overall configuration example of a system according to a first embodiment.

FIG. 1 is a diagram illustrating an overall configuration example of a system according to a first embodiment. As illustrated in FIG. 1, this system includes a plurality of base station devices and a mobile device 10. The mobile device 10, for example, is a mobile terminal such as a smartphone and mobile phone.

The mobile device 10 estimates location information of the mobile device 10 from reception sensitivity information at an arbitrary point. For example, the mobile device 10 specifies a base station device 1 that has the strongest radio wave intensity among the communicable base station devices. The mobile device 10 also specifies a base station device 2 and a base station device 3 in the vicinity of the base station device 1. The mobile device 10 then selects algorithm used for estimating the location of the mobile device 10, based on the number of circles around the location of the specified base station device. The mobile device 10 then estimates the location of the mobile device 10, based on the selected algorithm and the location relation between the circles around the location of the base station device.

In other words, the mobile device 10 estimates the location of the mobile device 10 by using the algorithm corresponding to the location relation between the circles, such as the number of circles around the captured base station devices, the presence of an intersection point of the circles, and a triangle in which the vertex is the center of each circle. Hence, the mobile device can measure its location with high accuracy.

Hardware Configuration

Figure 2:
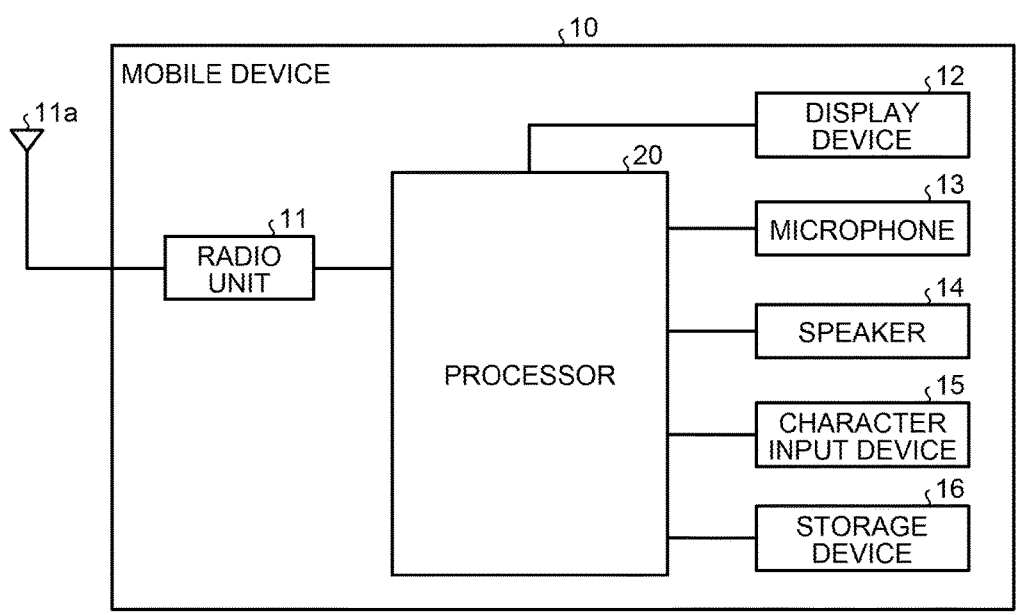
FIG. 2 is a diagram illustrating a hardware configuration example of a mobile device according to the first embodiment.

FIG. 2 is a diagram illustrating a hardware configuration example of the mobile device according to the first embodiment. As illustrated in FIG. 2, the mobile device 10 includes a radio unit 11, a display device 12, a microphone 13, a speaker 14, a character input device 15, a storage device 16, and a processor 20.

The radio unit 11 performs communication with another mobile device and a base station device, using an antenna 11a. The display device 12 is a display device such as a touch panel and a display, and displays various types of information. The microphone 13 collects sound and inputs the collected sound to the processor 20. The speaker 14 outputs the sound input from the processor 20.

The character input device 15 is a keyboard or a keyboard displayed on a touch panel, and receives various inputs from a user and outputs them to the processor 20. The storage device 16 is a storage device such as a memory and a hard disk, and stores therein computer programs executed by the processor 20, processing results generated by the computer program and the like executed by the processor 20, various tables, and the like.

The processor 20 is a processing unit that controls the entire processing of the mobile device 10. The processor 20 reads out a computer program from the storage device 16 and executes the process. For example, the processor 20 runs a process that executes processing, which will be described with reference to FIG. 3 and thereafter. The processor 20 may also be configured of two or more pieces.

Functional Configuration

Figures 3, 4:
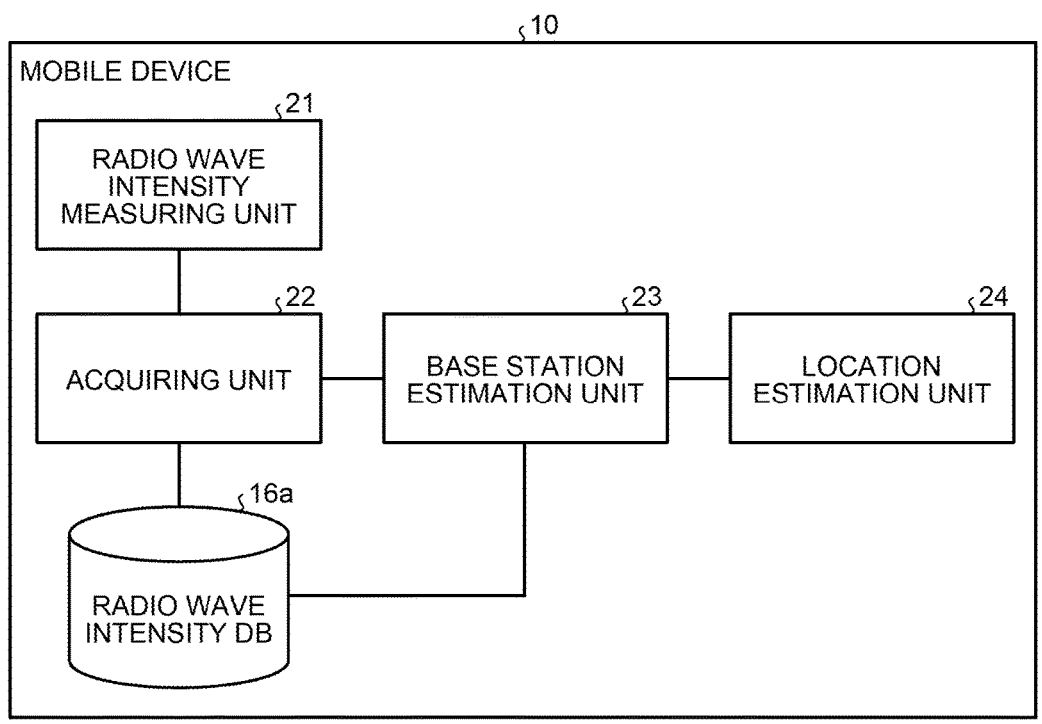
FIG. 3 is a functional block diagram illustrating a functional configuration of the mobile device according to the first embodiment.
FIG. 4 is an exemplary diagram illustrating information stored in a radio wave intensity DB.

FIG. 3 is a functional block diagram illustrating a functional configuration of the mobile device according to the first embodiment. As illustrated in FIG. 3, the mobile device 10 includes a radio wave intensity database (DB) 16a, a radio wave intensity measuring unit 21, an acquiring unit 22, a base station estimation unit 23, and a location estimation unit 24.

The radio wave intensity DB 16a is a database stored in the storage device 16. The radio wave intensity measuring unit 21, the acquiring unit 22, the base station estimation unit 23, and the location estimation unit 24 are an example of an electronic circuit of the processor 20, and an example of a process performed by the processor 20.

The radio wave intensity DB 16a is a database that stores therein the radio wave intensity state measured by the mobile device 10 and other mobile devices. FIG. 4 is an exemplary diagram illustrating information stored in a radio wave intensity DB. As illustrated in FIG. 4, the radio wave intensity DB 16a stores therein "serial number, base station ID, latitude, longitude, radio wave intensity, frequency, reliability, and primary scrambling code (PSC)" in association with each other.

The "serial number" stored here is an identification number that identifies information, and for example, is generated in the order of measurement or in the order in which the information is reported to the base station device. The "base station ID" is an identifier that uniquely identifies a base station, and for example, is assigned in advance to each base station by a manager and the like. The "latitude and longitude" are location information of the mobile device that measures the radio wave intensity. The "radio wave intensity" is radio wave intensity measured by the mobile device, and it is the radio wave intensity between the mobile device and the base station device. The "radio wave intensity" is, for example, received signal code power (RSCP). The "frequency" is a frequency used by the mobile device for communication, and is a frequency used for measuring the radio wave intensity. The "reliability" indicates the accuracy of the "latitude and longitude". The "PSC" is an identifier that identifies the cell.

An explanation will now be given with reference to the serial number 1 in FIG. 4. The serial number 1 is information when the mobile device located at the "latitude of 36.2 degrees and longitude of 139.1 degrees" measures the radio wave intensity while communicating with the base station device that has the base station ID 10 and the PSC P00. The radio wave intensity at this time is "−80", the frequency is "800 MHz", and the reliability is "A". It is assumed that the highest reliability is A, followed by B and C.

The radio wave intensity measuring unit 21 is a processing unit that measures the radio wave intensity between the mobile device and the base station device, and notifies the base station device of the measured radio wave intensity. More specifically, the radio wave intensity measuring unit 21 measures the radio wave intensity between the mobile device 10 and the base station device 1 captured by the mobile device 10 at a predetermined interval, and transmits the measurement result to the base station device 1. For example, the radio wave intensity measuring unit 21 transmits the measured location information (latitude and longitude) of the mobile device, the ID of the communicable base station device being captured, the frequency, the measured time, and the PSC to the base station device 1.

The acquiring unit 22 is a processing unit that acquires the radio wave intensity state. More specifically, the acquiring unit 22 acquires the information illustrated in FIG. 4 from the base station device 1 captured by the mobile device 10. The acquiring unit 22 then stores the acquired information in the radio wave intensity DB 16a.

The base station estimation unit 23 is a processing unit that estimates the location information of the base station device captured by the mobile device 10 and a base station device located in the vicinity of the base station device by using the information stored in the radio wave intensity DB 16a.

For example, if the ID of the base station device captured by the mobile device 10 is "10", in other words, if the ID of the serving base station device is "10", the base station estimation unit 23 specifies four records corresponding to "10" under the "base station ID" of the radio wave intensity DB 16a in FIG. 4. The base station estimation unit 23 then extracts three pieces of data in which the "radio wave intensity" of each of the specified records is within a range of "±10". Next, the base station estimation unit 23 specifies the corresponding "latitude and longitude" for each of the three pieces of data. The base station estimation unit 23 then estimates that the center of a circle that passes through the "latitude and longitude" of the specified three pieces of data is the location of the base station device that has the "base station ID 10".

The base station estimation unit 23 performs the same process on a neighboring base station device in the vicinity of the base station device that has the "base station ID 10". For example, the base station estimation unit 23 performs the process described above on the record that matches with the PSC of the neighboring base station device captured as a handover destination. The base station estimation unit 23 also estimates up to three locations of the base station devices, and estimates at least one location of the base station device. The base station estimation unit 23 also outputs the location of the estimated base station device and the radio wave intensity of each base station device, to the location estimation unit 24. The base station estimation unit 23 can also select the strongest radio wave intensity of the specified three records, as the radio wave intensity of the base station device. The base station estimation unit 23 can also calculate the average value of the radio wave intensities of the specified three records.

The location estimation unit 24 is a processing unit that selects algorithm based on the number of circles around the location of each of the base station devices estimated by the base station estimation unit 23, and estimates the location of the mobile device 10, based on the selected algorithm and the location relation between the circles.

More specifically, the location estimation unit 24 acquires the location of the base station device and the radio wave intensity from the base station estimation unit 23. The location estimation unit 24 then calculates the distance between the base station device and the mobile device 10, from the estimated location of the base station device and the radio wave intensity. Various known methods may be employed to calculate the distance from the location and the radio wave intensity, and for example, the distance becomes shorter with an increase in the radio wave intensity.

The location estimation unit 24 generates a circle the radius of which is the calculated distance, around the location of the estimated base station device. The location estimation unit 24 also generates a circle for the neighboring base station device by performing the same process.

The location estimation unit 24 estimates the location of the mobile device 10 by selecting algorithm corresponding to the intersections of the generated circles and the location relationship. Although detailed examples of the estimation will be given below, an example will now be described.

Figure 5:
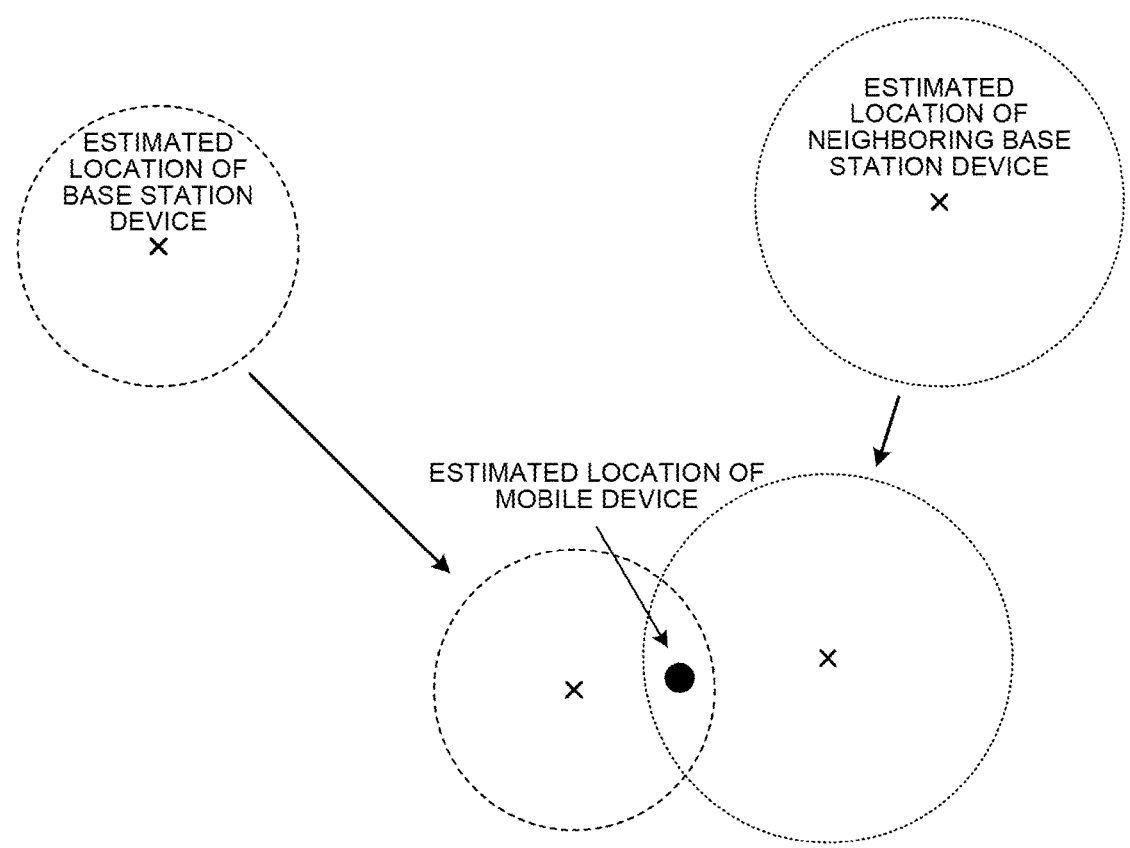
FIG. 5 is a diagram for explaining how the location of the mobile device is estimated.

FIG. 5 is a diagram for explaining how the location of the mobile device is estimated. As illustrated in FIG. 5, the location estimation unit 24 generates a circle the radius of which is estimated from the radio wave intensity and the like, around the location of the base station device captured by the mobile device 10. Similarly, the location estimation unit 24 generates a circle the radius of which is estimated from the radio wave intensity and the like, around the location of a neighboring base station device of the base station device captured by the mobile device 10. The location estimation unit 24 then estimates that a range where the circles intersect with each other is the location of the mobile device 10.

Location Estimation Process on Base Station Device

Figure 6:
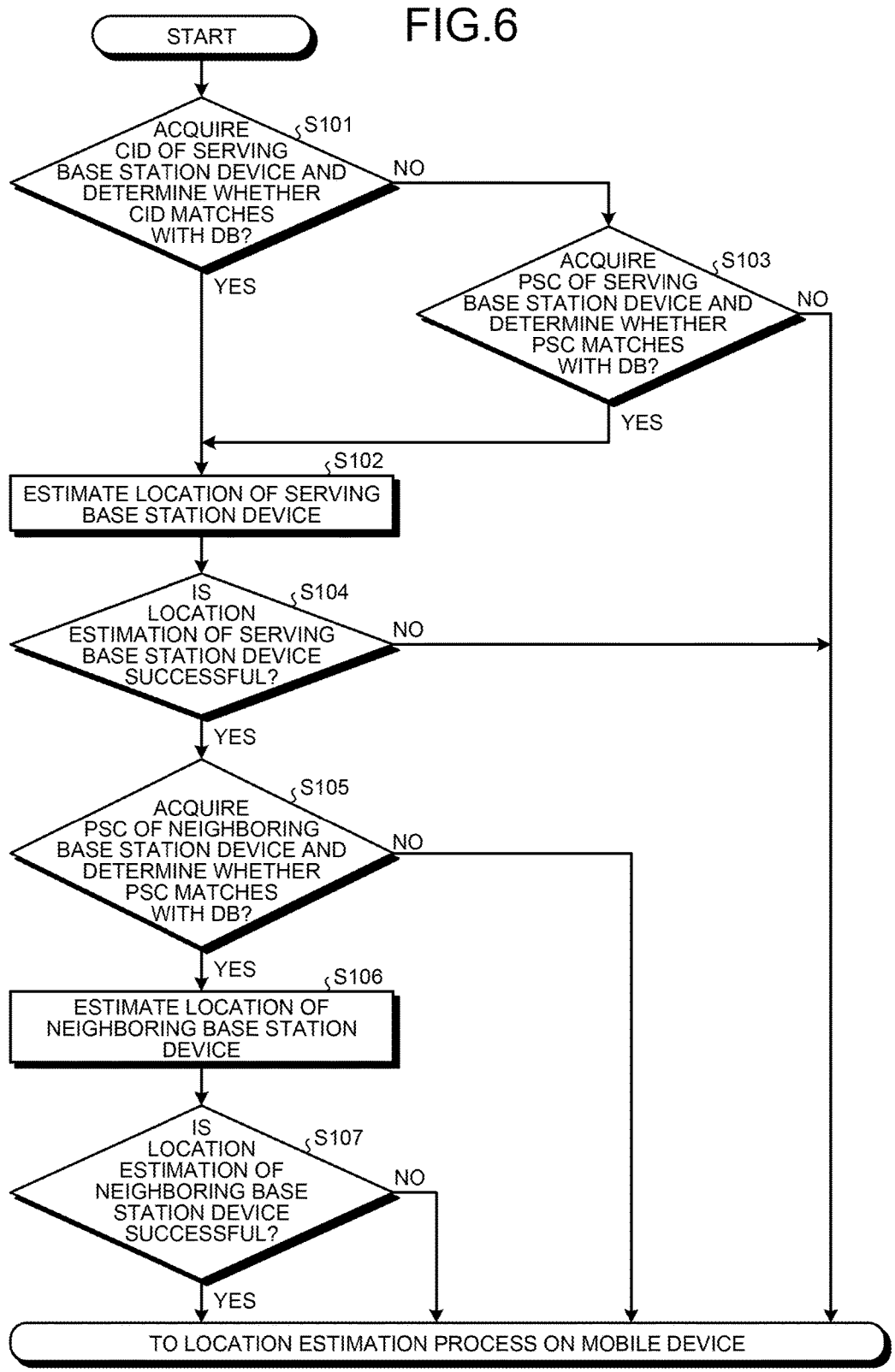
FIG. 6 is a flowchart illustrating a flow of a location estimation process on a base station device.

FIG. 6 is a flowchart illustrating a flow of a location estimation process on a base station device. As illustrated in FIG. 6, the base station estimation unit 23 acquires the Cell ID (CID) of the serving base station device, and determines whether it matches with the DB (S101). For example, the base station estimation unit 23 acquires the ID of the base station device, which is captured by the mobile device 10 and communicating with the mobile device 10, from the communication information, and extracts the data corresponding to the acquired ID from the radio wave intensity DB 16a.

If the CID of the serving base station device matches with the DB (Yes at S101), the base station estimation unit 23 estimates the location of the serving base station device (S102). For example, the base station estimation unit 23 extracts three pieces of data corresponding to the ID of the base station device captured by the mobile device 10 from the radio wave intensity DB 16a, and estimates that the center of the circle that passes through the "latitude and longitude" of each data is the location of the base station device.

If at S101, the CID of the serving base station device does not match with the DB (No at S101), the base station estimation unit 23 acquires the PSC of the serving base station device, and determines whether it matches with the DB (S103). For example, the base station estimation unit 23 acquires the PSC of the base station device, which is captured by the mobile device 10 and communicating with the mobile device 10, from the communication information, and extracts data corresponding to the acquired PSC from the radio wave intensity DB 16a. If the acquired PSC of the serving base station device matches with the DB (Yes at S103), S102 is performed. If the acquired PSC of the serving base station device does not match with the DB (No at S103), a location estimation process is performed on the mobile device.

If the location estimation of the serving base station device is successful (Yes at S104), the base station estimation unit 23 acquires the PSC of the neighboring base station device, and determines whether it matches with the DB (S105). For example, the base station estimation unit 23 acquires the PSC of the neighboring base station device of the base station device captured by the mobile device 10, from the communication information of the neighboring base station device, the serving base station device, and the like, and extracts data corresponding to the acquired PSC from the radio wave intensity DB 16a.

If the PSC of the neighboring base station device matches with the DB (Yes at S105), the base station estimation unit 23 estimates the location of the neighboring base station device (S106). For example, the base station estimation unit 23 extracts three pieces of data corresponding to the PSC of the neighboring base station device from the radio wave intensity DB 16a, and estimates that the center of the circle that passes through the "latitude and longitude" of each data is the location of the neighboring base station device.

Regardless of whether the location estimation of the neighboring base station device is successful (Yes at S107) or not (No at S107), the base station estimation unit 23 shifts the process to the location estimation process on the mobile device 10.

If the PSC of the serving base station device does not match with the DB (No at S103) or if the PSC of the neighboring base station device does not match with the DB (No at S105), the base station estimation unit 23 shifts the process to the location estimation process on the mobile device 10, without performing the subsequent processes.

Location Estimation Process on Mobile Device

Figure 7:
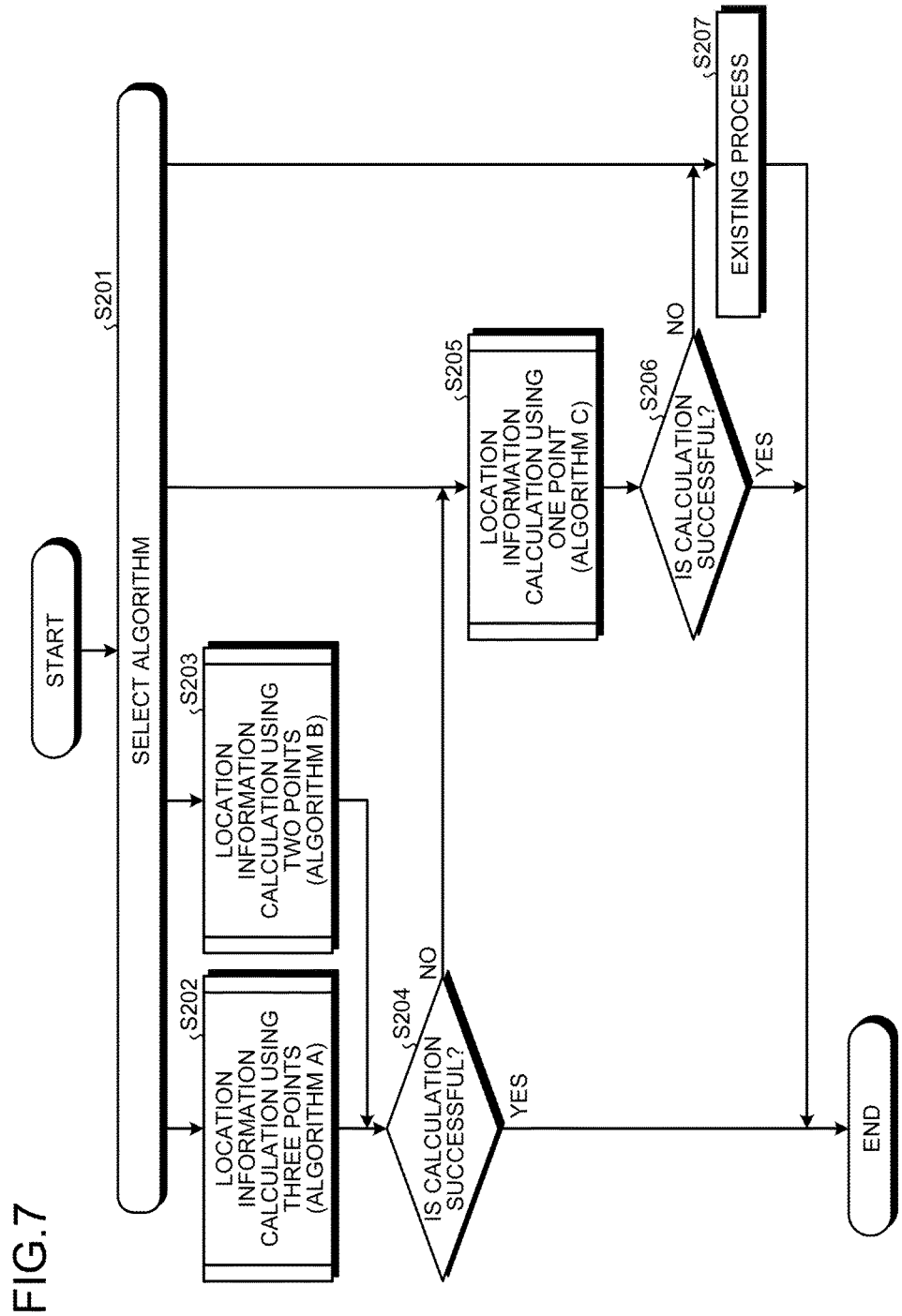
FIG. 7 is a flowchart illustrating a flow of a location estimation process on the mobile device.

FIG. 7 is a flowchart illustrating a flow of a location estimation process on the mobile device. As illustrated in FIG. 7, the location estimation unit 24 selects algorithm based on the number of the base station device and the neighboring base station devices detected in FIG. 6, and the like (S201).

If the total number of the base station device and the neighboring base station devices is three, the location estimation unit 24 performs a location information calculation process using three points (algorithm A) (S202). If the total number of the base station device and the neighboring base station devices is two, the location estimation unit 24 performs a location information calculation process using two points (algorithm B) (S203).

If the calculation of the location information of the mobile device 10 is successful by using the algorithm A or algorithm B (Yes at S204), the location estimation unit 24 finishes the process.

If the calculation of the location information of the mobile device 10 is not successful by using the algorithm A or algorithm B (No at S204), or if the total number of the base station device and the neighboring base station devices is one, the location estimation unit 24 performs algorithm C (S205).

In other words, the location estimation unit 24 performs a location information calculation process using one point. For example, the location estimation unit 24 calculates the distance between the mobile device 10 and the base station device, from the radio wave intensity of the record corresponding to the base station device detected in FIG. 6 and the estimated location of the base station device. The location estimation unit 24 then generates a circle the radius of which is the estimated distance, from the estimated location of the base station device, and estimates that the circumference of the generated circle is the location of the mobile device 10. In other words, the location estimation unit 24 estimates that the mobile device 10 is located somewhere in the circumference.

If the calculation of the location information of the mobile device 10 is successful by using the algorithm C (Yes at S206), the location estimation unit 24 finishes the process. If the calculation of the location information of the mobile device 10 is not successful by using the algorithm C (No at S206), the location estimation unit 24 performs the existing location information calculation process (S207).

Flow of Algorithm A

Figure 8:
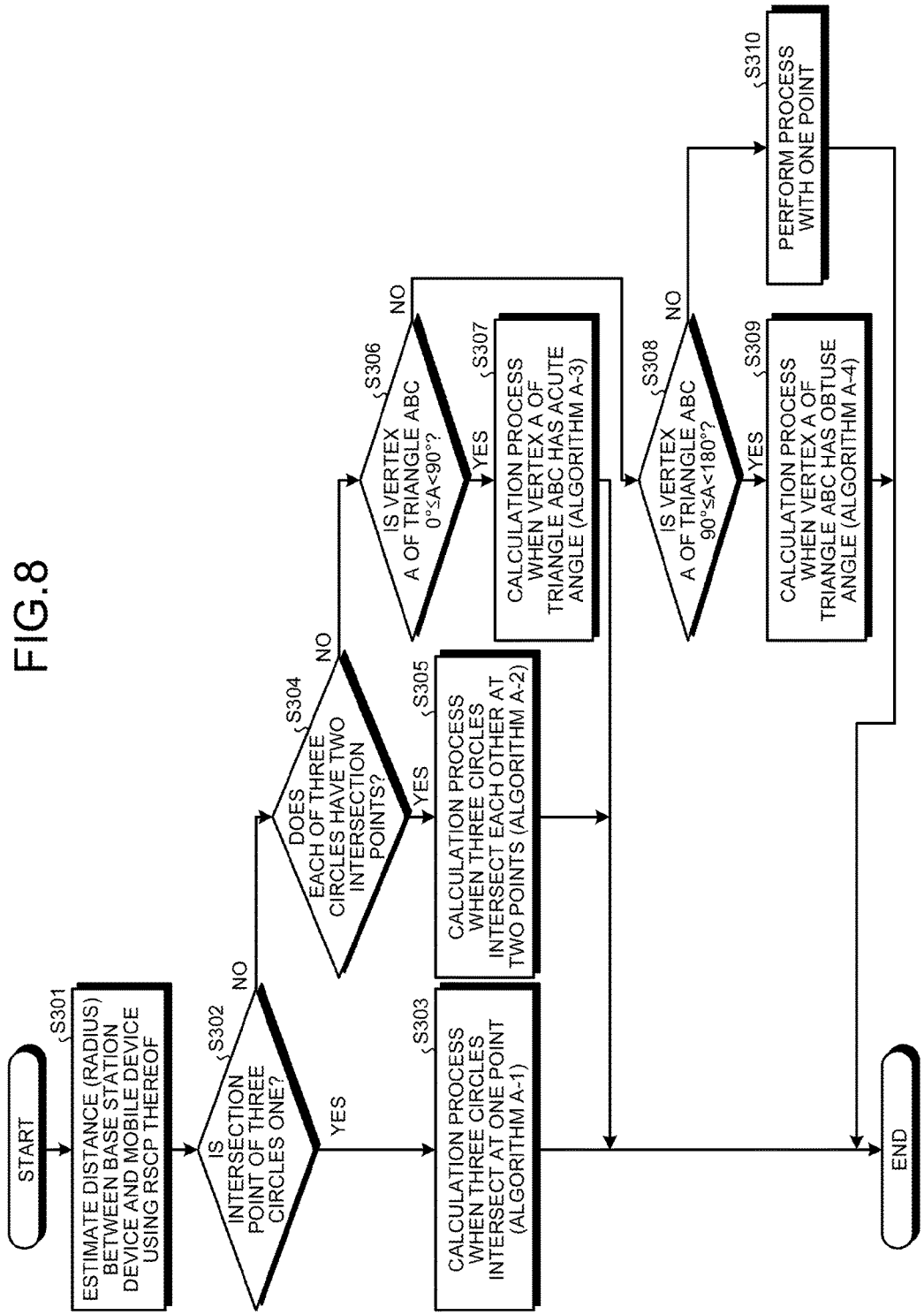
FIG. 8 is a flowchart illustrating a flow of a location information calculation process using three points.

FIG. 8 is a flowchart illustrating a flow of the location information calculation process using three points. This process is to be performed at S202 in FIG. 7. As illustrated in FIG. 8, the location estimation unit 24 estimates the distance between the mobile device 10 and the base station device by using the radio wave intensity (RSCP), for the three base station devices (S301).

Next, the location estimation unit 24 generates a circle the radius of which is the estimated distance, around the location of the base station device, for each of the base station devices, and determines whether the intersection point of the three circles is one (S302).

If the intersection point of the three circles is one (Yes at S302), the location estimation unit 24 performs a calculation process for the case where the three circles intersect at one point (algorithm A-1) (S303). In other words, the location estimation unit 24 estimates that the point where the three circles intersect is the location of the mobile device 10.

If the intersection point of the three circles is not one (No at S302), but each of the three circles has two intersection points (Yes at S304), the location estimation unit 24 performs a calculation process for the case where the three circles intersect with each other at two points (algorithm A-2) (S305).

If each of the three circles does not have two intersection points (No at S304), the location estimation unit 24 determines whether a vertex A of a triangle ABC, in which the vertex is the center of each circle, is equal to or more than 0 degrees and less than 90 degrees (S306). In other words, the location estimation unit 24 determines whether each vertex of the triangle, in which the vertex is the center of each circle, has an acute angle.

If the vertex A of the triangle ABC is equal to or more than 0 degrees and less than 90 degrees (Yes at S306), the location estimation unit 24 performs a calculation process for the case where the vertex A of the triangle ABC has an acute angle (algorithm A-3) (S307).

If the vertex A of the triangle ABC is not equal to or more than 0 degrees and less than 90 degrees (No at S306), the location estimation unit 24 determines whether the vertex A of the triangle ABC, in which the vertex is the center of each circle, is equal to or more than 90 degrees and less than 180 degrees (S308). In other words, the location estimation unit 24 determines whether any of the vertices of the triangle, in which the vertex is the center of each circle, has an obtuse angle.

If the vertex A of the triangle ABC is equal to or more than 90 degrees and less than 180 degrees (Yes at S308), the location estimation unit 24 performs a calculation process for the case where the vertex A of the triangle ABC has an obtuse angle (algorithm A-4) (S309).

If the vertex A of the triangle ABC is not equal to or more than 90 degrees and less than 180 degrees (No at S308), the location estimation unit 24 performs the process with one point (S310). In other words, the location estimation unit 24 performs S205 in FIG. 7 by using the information on the base station device that has the strongest radio wave intensity.

Algorithm A-2

Figure 9:
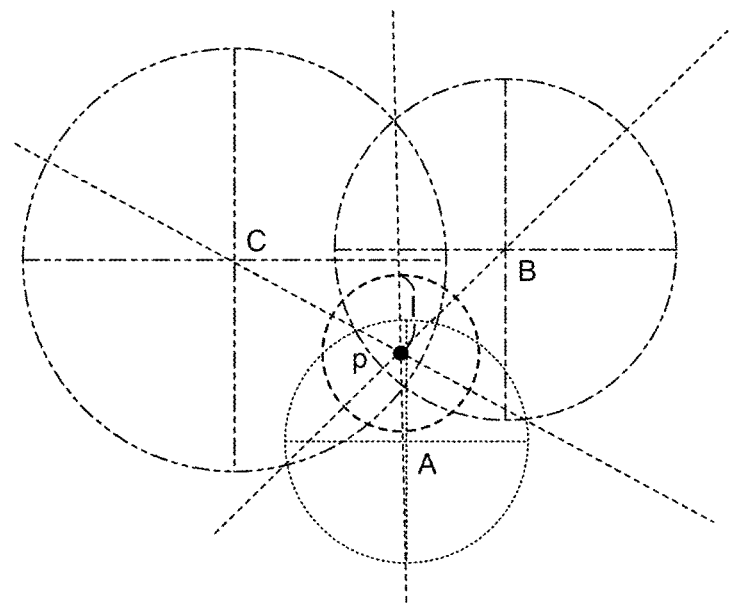
FIG. 9 is a diagram for explaining algorithm A-2.

FIG. 9 is a diagram for explaining the algorithm A-2. A, B, and C in FIG. 9 illustrate the location of the estimated base station device or the neighboring base station device. Here, the circle becomes smaller with an increase in the radio wave intensity of the base station device. Thus, the radio wave intensity is stronger in the order of the circle around the base station device A, the circle around the base station device B, and the circle around the base station device C.

In FIG. 9, the three circles intersect with each other at two points. Hence, the location estimation unit 24 specifies the location information (such as latitude and longitude) of an intersection point p, which is the intersection point of the line segment joining the intersection points. The location estimation unit 24 then estimates that the location information of the intersection point p is the location of the mobile device 10. The location estimation unit 24 may also generate a circle the radius of which is a predetermined 1, around the intersection point p, as an error circle, and estimate that the mobile device 10 is located at least within the range of the error circle.

Algorithm A-3

Figure 10:
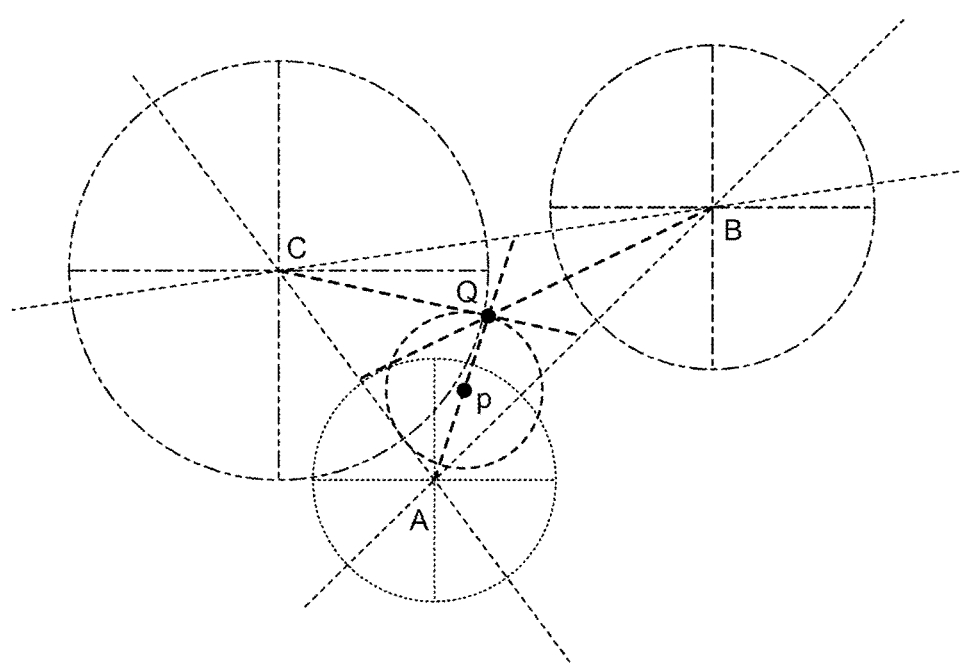
FIG. 10 is a diagram for explaining algorithm A-3.

FIG. 10 is a diagram for explaining the algorithm A-3. The explanations of A, B, C, and the like are omitted, because they are the same as those in FIG. 9.

In FIG. 10, the three circles do not intersect with each other at two points or do the three circles intersect at one point. Hence, the location estimation unit 24 determines that the vertices of the triangle ABC, in which the vertex is the location of each base station device, have acute angles.

The location estimation unit 24 then calculates a centroid Q of the triangle ABC. The location estimation unit 24 then estimates that a midpoint p, which is the midpoint of the line segment joining the centroid Q and the vertex A, which is the location of the base station device that has the strongest radio wave intensity, is the location of the mobile device 10. Similarly, the location estimation unit 24 may also generate a circle the radius of which is a predetermined 1, around the intersection point p, as an error circle, and estimate that the mobile device 10 is located at least within the range of the error circle.

Algorithm A-4

Figure 11:
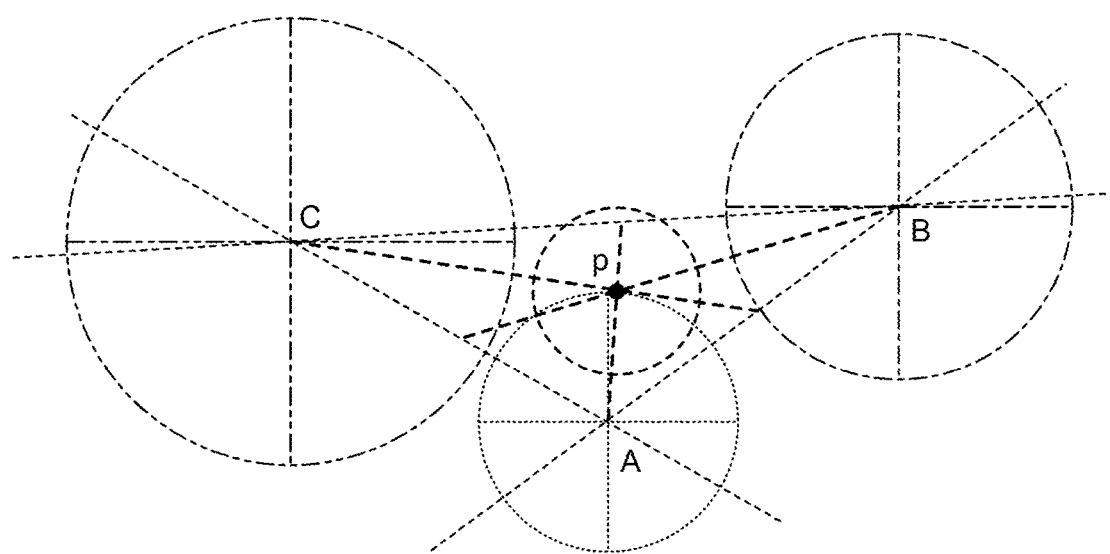
FIG. 11 is a diagram for explaining algorithm A-4.

FIG. 11 is a diagram for explaining the algorithm A-4. The explanations of A, B, C and the like are omitted, because they are the same as those in FIG. 9. Here, it is assumed that the vertex A has an obtuse angle. However, the same process may be performed when the other vertex has an obtuse angle.

In FIG. 11, the three circles do not intersect with each other at two points or do the three circles not intersect at one point. Hence, the location estimation unit 24 determines that the vertex A, which is the location of the base station device that has the strongest radio wave intensity, of the triangle ABC, in which the vertex is the location of each base station device, has an obtuse angle.

The location estimation unit 24 then calculates the centroid of the triangle ABC and estimates that the calculated centroid is the location of the mobile device 10. Similarly, the location estimation unit 24 may also generate a circle the radius of which is a predetermined 1, around the intersection point p, as an error circle, and estimate that the mobile device 10 is located at least within the range of the error circle.

Flow of Algorithm B

Figure 12:
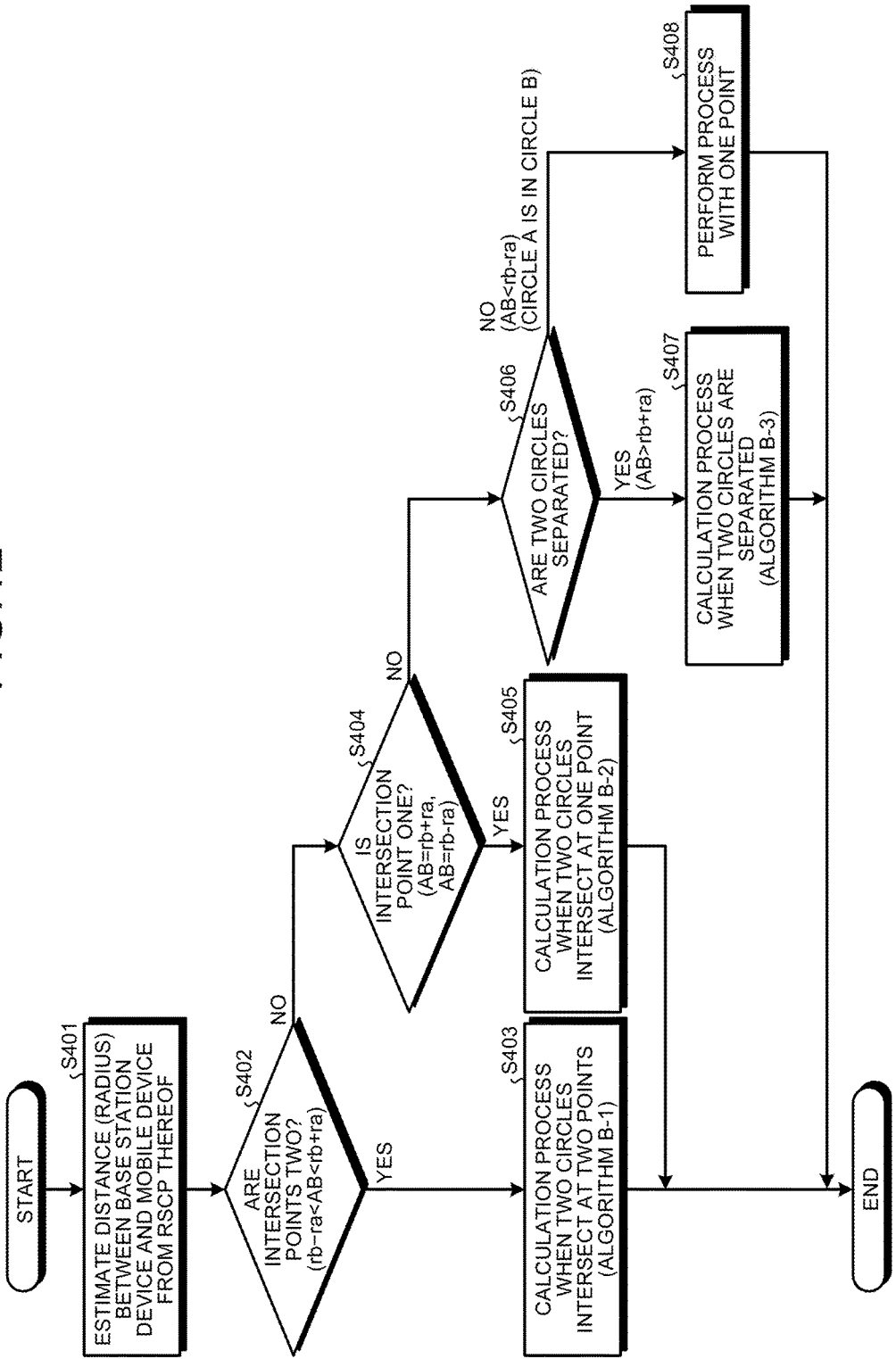
FIG. 12 is a flowchart illustrating a flow of a location information calculation process using two points.

FIG. 12 is a flowchart illustrating a flow of the location information calculation process using two points. This process is to be performed at S203 in FIG. 7. Here, the location estimation unit 24 sets the radiuses of two circles, a circle A and a circle B, to ra and rb, respectively, and sets the length of the line segment joining the center of the circle A and the center of the circle B, to AB. Also, it is assumed ra≤rb.

As illustrated in FIG. 12, the location estimation unit 24 estimates the distance between the mobile device 10 and the base station device by using the radio wave intensity (RSCP), for the two base station devices (S401).

Next, the location estimation unit 24 generates a circle the radius of which is the estimated distance, around the location of the base station device, for each of the base station devices, and determines whether the intersection points of the two circles are two (S402). In other words, the location estimation unit 24 determines whether rb−ra<AB<rb+ra.

If the intersection points are two (Yes at S402), the location estimation unit 24 performs a calculation process for the case where the two circles intersect at two points (algorithm B-1) (S403).

If the intersection points of the two circles are not two (No at S402), but the two circles have one intersection point (Yes at S404), the location estimation unit 24 performs a calculation process for the case where the two circles intersect at one point (algorithm B-2) (S405). In other words, if rb−ra=AB or AB=rb+ra, the location estimation unit 24 estimates that the point where the two circles intersect is the location of the mobile device 10.

If the two circles do not have an intersection point (No at S404), the location estimation unit 24 determines whether the two circles are separated from each other (S406). In other words, the location estimation unit 24 determines whether AB<rb−ra or AB>rb+ra.

If the two circles are separated from each other (Yes at S406), the location estimation unit 24 performs a calculation process for the case where the two circles are separated from each other (algorithm B-3) (S407). In other words, the location estimation unit 24 performs the algorithm B-3 when AB>rb+ra.

If the two circles are not separated from each other (No at S406), the location estimation unit 24 performs the process with one point (S408). In other words, if it is AB<rb−ra and if the circle A is in the circle B, the location estimation unit 24 performs S205 in FIG. 7 by using the information on the base station device that has the strongest radio wave intensity.

Algorithm B-1

Figure 13:
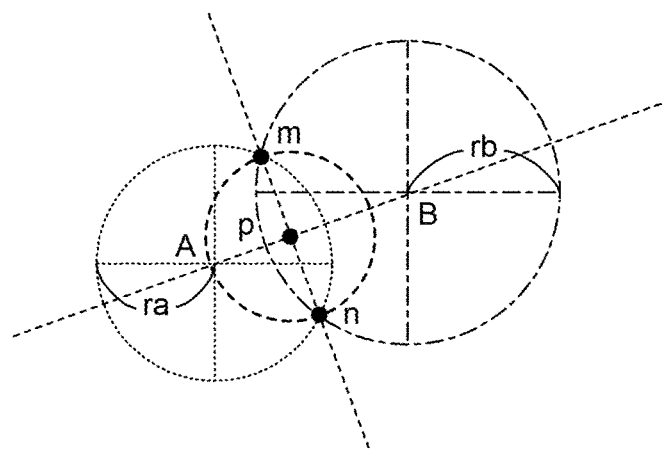
FIG. 13 is a diagram for explaining algorithm B-1.

FIG. 13 is a diagram for explaining the algorithm B-1. A and B in FIG. 13 illustrate the location of the estimated base station device or the neighboring base station device. Here, the circle becomes smaller with an increase in the radio wave intensity of the base station device. Thus, the radio wave intensity is stronger in the order of the circle A around the base station device A and the circle B around the base station device B. Here, as an example, the radiuses of the two circles, the circle A and the circle B, are ra and rb, respectively, and the length of the line segment joining the center of the circle A and the center of the circle B, is AB. Also, it is assumed ra≤rb.

In FIG. 13, because the two circles intersect with each other at two points, the location estimation unit 24 sets the respective intersection points to m and n. The location estimation unit 24 then estimates that the location of the intersection point p where the straight line AB and the straight line mn intersect with each other, is the location of the mobile device 10. The location estimation unit 24 may also generate a circle the radius of which is a predetermined 1, around the intersection point p, as an error circle, and estimate that the mobile device 10 is located at least within the range of the error circle.

Algorithm B-3

Figure 14:
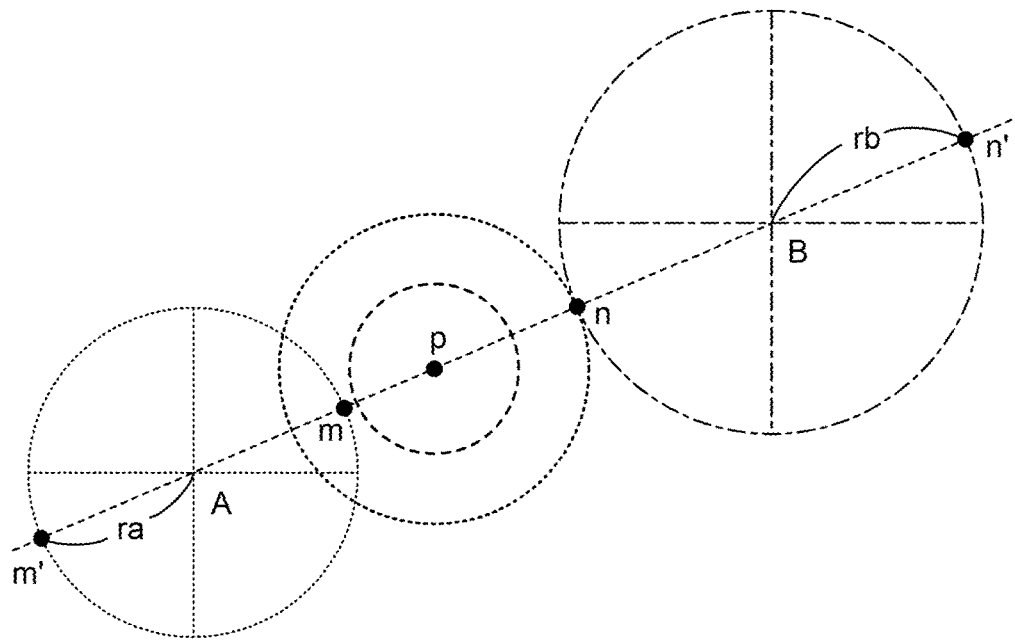
FIG. 14 is a diagram for explaining algorithm B-3.

FIG. 14 is a diagram for explaining the algorithm B-3. The explanation of FIG. 14 will be omitted, because it is the same as that in FIG. 13.

In FIG. 14, the location estimation unit 24 determines that the two circles are separated from each other. Between the intersection points of the straight line AB and the circle A, the location estimation unit 24 sets the intersection point at the side of the circle B to m, and the intersection point at the side opposite from the circle B to m'. Also, between the intersection points of the straight line AB and the circle B, the location estimation unit 24 sets the intersection point at the side of the circle A to n, and the intersection point at the side opposite from the circle A to n'.

The location estimation unit 24 then estimates that the point p, where the line segment mn joining the intersection point m and the intersection point n is divided by the radius ratio of the circle A and the circle B (ra:rb), is the location of the mobile device 10. The location estimation unit 24 may also generate a circle the radius of which is a predetermined 1, around the intersection point p, as an error circle, and estimate that the mobile device 10 is located at least within the range of the error circle.

Effects

The mobile device 10 narrows down the location of the mobile device 10 by selecting an appropriate algorithm, from the location information of the captured base station device such as the serving base station device and the neighboring base station device, and the location of the mobile device 10 estimated by using the base station devices. Hence, it is possible to measure the location of the mobile device 10 with high accuracy. The mobile device 10 also does not use the GPS and the like. As a result, it is possible to reduce power consumption.

[b] Second Embodiment

While the embodiment of the present invention has been described, it is to be understood that the present invention is not limited to the above-described embodiment and various changes and modifications may be made.

Location Information of Mobile Device

The mobile device 10 may also use coordinates instead of the "latitude and longitude" as the location information of the mobile device 10. For example, when the radio wave state illustrated in FIG. 4 is to be managed by the "latitude and longitude", the mobile device 10 can estimate the "latitude and longitude" of the mobile device 10 by performing the process described above by using the "latitude and longitude". When the radio wave state illustrated in FIG. 4 is to be managed by the "coordinates", the mobile device 10 can estimate the "coordinates" of the mobile device 10 by performing the process described above by using the "coordinates".

Radio Wave Intensity

In the embodiment described above, the RSCP is used as the radio wave intensity. However, it is not limited thereto, and for example, another index such as a received signal strength indication (RSSI) may also be used.

System

Each of the constituents of the device in the drawings need not be physically configured as illustrated in the drawings. In other words, they can be dispersed and integrated in an optional unit. Furthermore, all or an optional part of the respective processing functions carried out in each device are implemented by a central processing unit (CPU) and a computer program analyzed and executed by the CPU, or may be implemented as hardware by the wired logic.

Among the processes described in the present embodiments, all or a part of the processes described as being automatically performed may be manually performed, or all or a part of the processes described as being manually performed may be automatically performed with a known method. In addition, the processing procedure, control procedure, specific names, and information including various kinds of data and parameters described in the specification and illustrated in the drawings can be optionally changed, unless otherwise specified.

The mobile device 10 described in the present embodiments can perform the same function as that of the process described with reference to FIG. 3 and the like by reading and performing the location estimation program. For example, the mobile device 10 loads the computer programs having the same functions as those of the radio wave intensity measuring unit 21, the acquiring unit 22, the base station estimation unit 23, and the location estimation unit 24 on the memory. The mobile device 10 can perform the same processes as those of the embodiment described above by performing the processes that execute the same processes as those of the radio wave intensity measuring unit 21, the acquiring unit 22, the base station estimation unit 23, and the location estimation unit 24.

The computer program can be distributed via a network such as the Internet. The computer program may also be recorded in a computer-readable recording medium such as a hard disk, a flexible disk (FD), a compact disc-read only memory (CD-ROM), a magneto optical (MO), and a digital versatile disc (DVD), and is executed by being read out from the recording medium by a computer.

According to the embodiments, it is possible to estimate location information with high accuracy.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A mobile device comprising:
a processor configured to execute a process including:
transmitting a radio wave intensity state to a first base station device having strongest radio wave intensity among a plurality of base station devices present at a location communicable with the mobile device, the radio wave intensity state including, for each of the plurality of base station devices, identifier of the base station device, radio wave intensity which is measured between the mobile device and the base station device and location information indicating a location of the mobile device which measures the radio wave intensity;
acquiring, from the first base station device, a first radio wave intensity state which the first base station device receives and stores from the mobile device and other mobile devices;
by referring to the acquired first radio wave intensity state, first estimating a center of a circle as the location of the first base station device, the circle passing through each location of mobile devices having an identifier of the first base station device;
by referring to the acquired first radio wave intensity state, second estimating, for each of neighboring base station devices in the vicinity of the first base station device, a center of a circle as the location of the neighboring base station device, the circle passing through each of the location of mobile devices having the identifier of a neighboring base station device;
generating a circle in which a distance between the mobile device and the first base station device estimated by using the radio wave intensity is set as a radius and in which the estimated location of the first base station device is set as a center;
generating, for each of the neighboring base station devices, a circle in which a distance between the mobile device and the neighboring base station device estimated by using the radio wave intensity is set as a radius and in which the estimated location of the neighboring base station device is set as a center; and
third estimating a location of the mobile device by using an algorithm selected based on the number of the generated circles and a location relation between the generated circles.

2. The mobile device according to claim 1, wherein when a plurality of circles generated intersect at a point, the third estimating includes estimating that the point is the location of the mobile device.

3. The mobile device according to claim 1, wherein when a plurality of circles corresponding to each of the first base station devices and two of the neighboring base station devices intersect with each other at two points, the third estimating includes estimating that an intersection point of a line segment joining a plurality of intersection points of the circles is the location of the mobile device.

4. The mobile device according to claim 1, wherein when an angle of each vertex of a triangle, in which a vertex is the location of the first base station device and the location of two of the neighboring base station devices, is an acute angle, the third estimating includes estimating that a midpoint of a line segment joining a centroid of the triangle and a vertex corresponding to a location of a base station device having strongest radio wave intensity is the location of the mobile device.

5. The mobile device according to claim 1, wherein when an angle of any vertex of a triangle, in which a vertex is the location of the first base station device and the location of two of the neighboring base station devices, is an obtuse angle, the third estimating includes estimating that a centroid of the triangle is the location of the mobile device.

6. The mobile device according to claim 1, wherein when a plurality of circles corresponding to each of the location of the first base station device and the location of the neighboring base station device intersect with each other at two points, the third estimating includes estimating that an intersection point between a line segment joining a plurality of intersection points of the circles and a line segment joining a center of each of the circles is the location of the mobile device.

7. The mobile device according to claim 1, wherein when a plurality of circles corresponding to each of the location of the first base station device and the location of the neighboring base station devices do not intersect, the second estimating includes extracting a plurality of intersection points between a line segment joining a center of each of the circles and each of the circles, and estimating that a point obtained by dividing a line segment joining each of the intersection points by a radius ratio of the circles is the location of the mobile device.

8. A location estimation method comprising:
transmitting a radio wave intensity state to a first base station device having strongest radio wave intensity among a plurality of base station devices present at a location communicable with the mobile device, the radio wave intensity state including, for each of the plurality of base station devices, identifier of the base station device, radio wave intensity which is measured between the mobile device and the base station device and location information indicating a location of the mobile device which measures the radio wave intensity, using a processor;
acquiring, from the first base station device, a first radio wave intensity state which the first base station device receives and stores from the mobile device and other mobile devices, using the processor;
by referring to the acquired first radio wave intensity state, estimating a center of a circle as the location of the first base station device, the circle passing through each location of mobile devices having an identifier of the first base station device, using the processor;
by referring to the acquired first radio wave intensity state, estimating, for each of neighboring base station devices in the vicinity of the first base station device, a center of a circle as the location of the neighboring base station device, the circle passing through each of the location of mobile devices having the identifier of a neighboring base station device, using the processor;
generating a circle in which a distance between the mobile device and the first base station device estimated by using the radio wave intensity is set as a radius and in which the estimated location of the first base station device is set as a center, using the processor;
generating, for each of the neighboring base station devices, a circle in which a distance between the mobile device and the neighboring base station device estimated by using the radio wave intensity is set as a radius and in which the estimated location of the neighboring base station device is set as a center, using the processor; and
estimating a location of the mobile device by using an algorithm selected based on the number of the generated circles and a location relation between the generated circles, using the processor.

9. A non-transitory computer-readable recording medium having stored therein a location estimation program that causes a mobile device to execute a process comprising:
transmitting a radio wave intensity state to a first base station device having strongest radio wave intensity among a plurality of base station devices present at a location communicable with the mobile device, the radio wave intensity state including, for each of the plurality of base station devices, identifier of the base station device, radio wave intensity which is measured between the mobile device and the base station device and location information indicating a location of the mobile device which measures the radio wave intensity;
acquiring, from the first base station device, a first radio wave intensity state which the first base station device receives and stores from the mobile device and other mobile devices;
by referring to the acquired first radio wave intensity state, estimating a center of a circle as the location of the first base station device, the circle passing through each location of mobile devices having an identifier of the first base station device;
by referring to the acquired first radio wave intensity state, estimating, for each of neighboring base station devices in the vicinity of the first base station device, a center of a circle as the location of the neighboring base station device, the circle passing through each of the location of mobile devices having the identifier of a neighboring base station device;
generating a circle in which a distance between the mobile device and the first base station device estimated by using the radio wave intensity is set as a radius and in which the estimated location of the first base station device is set as a center;
generating, for each of the neighboring base station devices, a circle in which a distance between the mobile device and the neighboring base station device estimated by using the radio wave intensity is set as a radius and in which the estimated location of the neighboring base station device is set as a center; and
estimating a location of the mobile device by using an algorithm selected based on the number of the generated circles and a location relation between the generated circles, using the processor.

* * * * *